(12) United States Patent
Fontanet

(10) Patent No.: US 9,322,636 B2
(45) Date of Patent: Apr. 26, 2016

(54) INDUCTIVE SENSOR FOR ANGULAR MEASUREMENT OF THE POSITION OF A MOVING PART AND MEASURING METHOD USING SUCH A SENSOR

(71) Applicants: CONTINENTAL AUTOMOTIVE FRANCE, Toulouse (FR); CONTINENTAL AUTOMOTIVE GmbH, Hannover (DE)

(72) Inventor: Alain Fontanet, Muret (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 169 days.

(21) Appl. No.: 14/096,247

(22) Filed: Dec. 4, 2013

(65) Prior Publication Data
US 2014/0167788 A1    Jun. 19, 2014

(30) Foreign Application Priority Data
Dec. 18, 2012    (FR) ..................................... 12 62238

(51) Int. Cl.
G01R 27/28    (2006.01)
G01B 7/30    (2006.01)
G01D 5/22    (2006.01)

(52) U.S. Cl.
CPC ................ *G01B 7/30* (2013.01); *G01D 5/2258* (2013.01)

(58) Field of Classification Search
CPC ................................ G01B 7/30; G01D 5/2258
USPC .......................................................... 324/656
See application file for complete search history.

(56) References Cited

U.S. PATENT DOCUMENTS 4,467,272 A  *  8/1984  Hassler .................. G01R 19/10
324/607

(Continued)

FOREIGN PATENT DOCUMENTS

FR       2964735       3/2012
WO   2005/098370     10/2005

OTHER PUBLICATIONS

French Search Report dated Jul. 19, 2013, corresponding to the Foreign Priority Application No. 1262238.

*Primary Examiner* — Benjamin M Baldridge
(74) *Attorney, Agent, or Firm* — Young & Thompson

(57) ABSTRACT

An inductive sensor includes a primary winding, two secondary windings and a moveable target, the primary winding being centered about a central axis and carrying a high-frequency alternating current which can induce a voltage in secondary windings, the secondary windings also being centered about the central axis and made up of a number k of substantially identical loops, which are successively crossed and arranged opposite the primary winding. In this case, the target is made up of a part having p=1 angular sector with an angular opening. The opening of the angular sector of the target is less than that of a loop of secondary winding with a deviation calculated such as to eliminate the fourth harmonic of the linearity deviation Fourier decomposition, between the measured angular value and real angular value for the position of the target over the measurement course.

10 Claims, 3 Drawing Sheets

(56) References Cited

U.S. PATENT DOCUMENTS

| | | | | |
|---|---|---|---|---|
| 5,263,258 A | * | 11/1993 | Dobler | G01B 7/30 33/1 N |
| 5,428,290 A | * | 6/1995 | Porcher | G01B 7/30 324/207.16 |
| 6,130,535 A | * | 10/2000 | Herden | G01D 5/145 324/207.2 |
| 7,508,197 B1 | * | 3/2009 | Rakov | G01B 7/30 324/207.25 |
| 2002/0017902 A1 | | 2/2002 | Vasiloiu | |
| 2006/0290338 A1 | * | 12/2006 | Kinpara | H02P 23/14 324/76.11 |
| 2010/0188104 A1 | * | 7/2010 | Speckmann | G01D 5/202 324/656 |
| 2013/0021023 A1 | * | 1/2013 | Niwa | G01D 5/202 324/207.15 |
| 2014/0002110 A1 | * | 1/2014 | Adachi | H02P 21/145 324/654 |

\* cited by examiner

US 9,322,636 B2

INDUCTIVE SENSOR FOR ANGULAR MEASUREMENT OF THE POSITION OF A MOVING PART AND MEASURING METHOD USING SUCH A SENSOR

FIELD OF THE INVENTION

The invention relates to an inductive sensor dedicated to the angular measurement of the position of a rotating part, as well as to a measuring method using this inductive sensor.

The field of the invention relates to the detection of the position of structures and mechanical parts which move, in particular a rotor of a rotating machine, using targets arranged on these structures.

The invention applies mainly, but not exclusively, to machine tools or other industrial machines, in aeronautics or in the car industry and, generally, each time where it is necessary to monitor the angular position of a mechanical element.

BACKGROUND OF THE INVENTION

Angular inductive sensors have a structure similar to that of linear inductive sensors: they include a "transformer" fixed part with a fixed primary circuit and at least one fixed secondary circuit, and a movable part made up by a metal target which is rigidly connected to the mechanical part to be angularly monitored. The fixed primary circuit is generally formed from a coil or from a circuit printed on a flat surface.

A high-frequency alternating current flows in the primary circuit. This current produces a magnetic field at the same frequency as the current flowing in the primary circuit. Each secondary circuit is also fixed and is placed on the same surface while forming at least two loops. The successive loops have a substantially identical surface for the reasons indicated below. They are crossed and therefore have an opposite orientation (from a trigonometric perspective).

As a result of the couplings between the primary circuit and the loops having a same surface of each secondary circuit, the primary flux creates magnetic fluxes seen as being reversed from one loop to the other of each secondary circuit.

In general, the surface of the target is at least as large as that of a loop of the secondary circuit and the movable target movement then modifies the coupling between the primary circuit and each loop of each secondary circuit. The measurement of the voltage induced at the terminals of the secondary circuits therefore allows the position of the mechanical part to be known. Therefore the successive positions of the target in front of the loops of the secondary circuit produce, in the loops of each secondary circuit, a quantity of magnetic flux, and therefore a voltage. The development of this voltage varies according to the position of the target and includes relative increases and decreases. In the end, this variation produces a curve which is quite close to a sine curve.

In other words, a voltage is induced in the loops of each secondary circuit. The sign of this voltage depends on the direction of the loop. The algebraic sum of these voltages varies according to the movement of the target in front of these loops: centered on two loops, the target creates a zero-sum voltage. Since the surfaces of the loops are identical, the voltage has an absolute value maximum when the target of a sensor is facing each loop when the size of the target is substantially identical to that of each secondary circuit loop.

For an angular sensor, the target angularly covers each loop of the secondary circuit. For example, for a secondary circuit having a course equal to 360° (two loops of 180°), the angular opening of the target is 180°. For a secondary circuit having a course equal to 180° (four loops of 90°), the target is made up of two angular sectors with a 90° opening, the vertex of the angular sectors being opposite. Generally, the opening angle of the target is equal to half of the course of the secondary circuit.

The inductive sensors, in particular angular inductive sensors where the position measured for the target is an angle, have errors in the measurement of the target angular position, and therefore of the mechanical part to be monitored. Several solutions have been proposed to solve this problem.

Patent document WO 2005/098370, for example, describes the use of a reference secondary loop, this reference being used for a more accurate measurement of the target position, following a prior calibration operation. Moreover, the patent document FR 2964735 aims to reduce the measuring errors through the use of compensation loops placed on the secondary circuits, which allow some parasitic components of the alternating signal received at the terminals of the secondary circuits to be removed.

However despite these improvements, the known solutions do not provide the angular sensors with a sufficient linearity in order to obtain reliable results. Furthermore, the sensitivity of a sensor is characterized by this linearity defined by a fictitious straight line which would be that approaching, at best, the real relationship between the measured angular value and the real angular value of the position of the target over the entire measurement range. The sensitivity is then measured by the proximity between the real angular measurement of the sensor and this fictitious straight line.

SUMMARY OF THE INVENTION

The aim of the invention is to improve the linearity of angular inductive sensors by analyzing, using Fourier transform, the function giving the measured angular value of the position of the target relative to the real angular value of the target position. This analysis has lead to reducing the angular opening of the target within a particular proportion.

More precisely, the present invention relates to an inductive sensor for measuring the angular position of a rotating part including a primary winding, associated with at least one secondary winding, and a target rigidly connected with the part rotating about a central axis, the primary winding being centered about an axis that is coincident with the central rotation axis of the target, and carrying a high-frequency alternating current which can induce a voltage in each secondary winding. In accordance with the International Telecommunication Union high frequency range designations, a high-frequency alternating current is understood by those of ordinary skill in the art to be in a frequency band of 3 MHz -30 MHz. Each secondary winding, which is also centered about the central axis, is made up of a number k (k≥2) of substantially identical loops, forming angular sectors, with opening SB, which are successively crossed and arranged opposite the primary winding. The target is made up of p (p≥1) angular sectors, having a same angular opening α of value α0 equal to the opening SB of the loop sectors and which are regularly distributed opposite the primary and secondary windings. In this inductive sensor, the opening α of each target angular sector is reduced by an adjustment angular sector SA which is equal to the fraction $$\frac{c}{(h*r)},$$

such that α=SB −SA, C being the angular scanning course of the sensor between two target successive positions that are on the whole identical, h being the order of the harmonic to be eliminated in a linearity deviation Fourier decomposition, which is defined between measured and real angular values for positions of the target over the course C, and r being the number k of loops per secondary winding relative to the number p of sectors of the target, i.e.

$$r = \frac{k}{p}.$$

According to some preferred embodiments:
the harmonic to be eliminated is of the 4th order and the adjustment angular sector SA is then equal to a quarter of the angular opening of each winding loop;
the sensor includes two secondary windings made up of substantially identical loops;
the secondary windings are offset by half a loop.

The invention also relates to a method for measuring an angular position of a rotatable part wherein the above inductive sensor is used; this method consists in successively masking angular sectors of each (the) secondary winding with an angular opening SB with each angular sector of the target with an opening α adjusted to ¾ of the angular opening SB, such that the voltage induced in each (the) secondary winding has a sinusoidal variation, measuring the voltage at the terminals of each (the) secondary winding, combining the amplitudes of the measured voltages using a same sinusoidal function and providing a positional measurement for the target at each moment as a function of the amplitude of the sinusoidal function at this moment.

Preferably, the function used is the arc tangent of the ratio of the amplitudes of the sinusoidal voltages measured at the terminals of two secondary windings, in phase quadrature.

BRIEF DESCRIPTION OF THE DRAWINGS

Other information, features and advantages of the present invention will emerge upon reading the following non-limited description with reference to the appended figures wherein.

DETAILED DESCRIPTION OF THE INVENTION

Figure 1A:
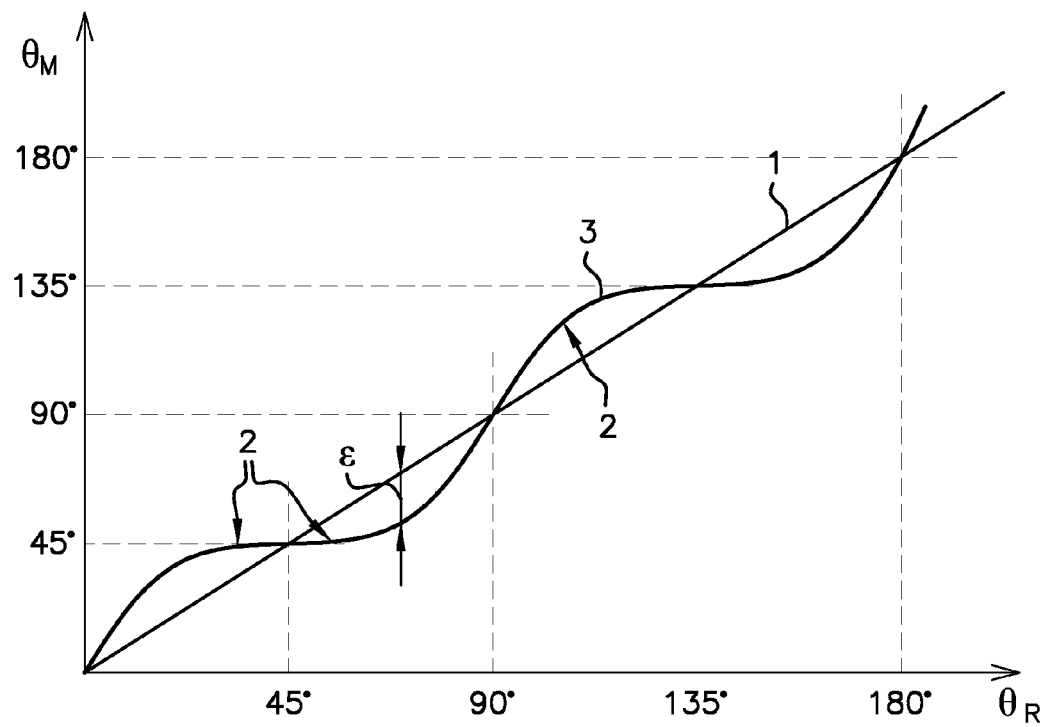
FIGS. 1a and 1b are two diagrams of the deviations between the measured target position angular value and the real value of the position angle according to the prior art.

FIG. 1a relates to the linearity deviations ϵ of the position angle ΘM of the target, as measured by a conventional inductive sensor, as a function of the real position angle ΘR. The inductive sensor is a sensor with a course equal to 360°, including a circular primary winding, two secondary windings placed at a right angle in order to provide two complementary sinusoidal induced voltages—each secondary winding is formed from two 180° angular opening elementary loops—and a 180° angular opening half-moon shaped target.

To this end, FIG. 1a illustrates two curves: the curve 3 of the variations of the position measured angle ΘM as a function of the position real angle ΘR of the target, and the straight line 1 representing a theoretical curve obtained when the measured angles ΘM coincide with the position real angles ΘR of the target. The observed curve 3 has oscillations 2 about this theoretical straight line 1 while cutting this straight line 1 at regular intervals, namely every 45°.

Figure 1B:
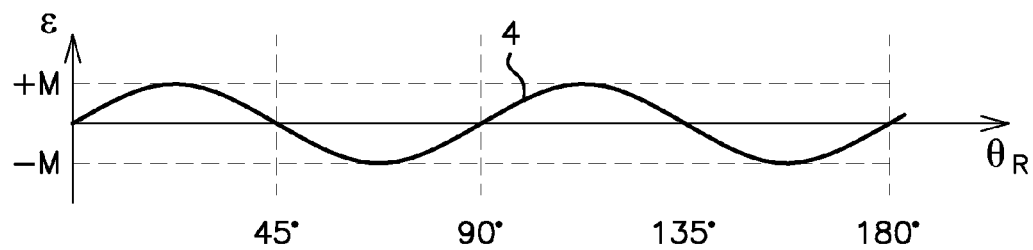

The linearity deviation ϵ corresponds to the difference ΘM−ΘR for a given ΘR value and changes sign every 45°. These deviations ϵ between the two curves 1 and 3 convey the lack of linearity of the sensor. By plotting the variations in the deviation ϵ against the position real angle ΘR, FIG. 1b more precisely illustrates the curve 4 of the positive and negative oscillations of the deviation ϵ which follow one another every 45°, by passing through a zero value. The curve 4 therefore has a sinusoidal shape and the deviation varies between maximum values +M and minimum values −M.

In order for the amplitude of the linearity deviation ϵ oscillations to get closer to zero for all of the values ΘM, there should therefore be compensation for the oscillations over 45° for a target with an opening, for example, equal to 180° and with a course equal to 360°. This consideration also corresponds to an approach by analysis using a Fourier decomposition of the linearity deviation of the induced voltage, also noted ϵ by analogy (since the cancellation of one cancels the other). This Fourier analysis provides the orders of the harmonics to be eliminated in order to reduce the linearity deviation to zero:

the 2nd order corresponds to a lack of symmetry between the loops of the windings which is easy to correct;

the 3rd order can only exist if the secondary winding has an uneven number of loops; yet, for the studied sensor and for any inductive sensor, an even number of loops is always provided so as to add up the elementary induced currents of each loop in order to provide the overall induced voltage;

the 4th order is therefore, in this case, the order to be eliminated as a matter of priority.

Generally, the rotating sensor measures an angle in an angular extended range, called a measuring course C. The angular course C corresponds to the angular scanning of the target between two successive positions that are on the whole identical. The target includes one or more regularly distributed sectors, with an angular opening α0 normally, according to the prior art, equal to the opening SB of a sector of a secondary winding loop.

This loop sector opening SB is equal to $$\frac{C}{2},$$

and the target opening α0 is then such that $$\alpha 0 = SB = \frac{C}{2},$$

as emerges from the examples below.

The course C can be 360°, i.e. a complete turn, and the secondary winding is then made up of two loops, each loop forming a sector with an opening SB equal to 180°, i.e.

$$SB = \frac{C}{2}.$$

Advantageously, the target then has a "half-moon" single angular sector shape with an angular opening α which is also equal to 180°.

The sensor can also have a course C which is less than 360° and, in this case, this range C can only have values of sub-multiples of 360°, namely 180°, 120°, 90°, etc., of the shape $$C = \frac{360}{p}$$

where p is a natural number greater than 1. In this case, the target has a periodic geometric shape with angular period $$C = \frac{360}{p},$$

made up of p regularly distributed angular sectors with, for each one, an angular opening α0 with a value $$\frac{C}{2}$$

which is equal to $$\frac{360}{2*p} \left(\text{namely } \frac{180}{p}\right).$$

Therefore, in all cases, the course C of the targets is equal to $$C = \frac{360}{p},$$

p being a whole number that is greater than or equal to 1 (equal to 1 when the target has a single sector with an angular opening of 180°, and greater than 1 when the target has p sectors with an opening angle 180/p).

To remove the linearity deviation of the measured position angle, the angular opening of the target is adjusted, according to the invention, by a value SA angular sector reduction, corresponding to the elimination of the 4th harmonic order. The angular opening of the target then takes a value α such that α=SB−SA.

The calculation of the Fourier decomposition of this linearity deviation shows, for example, that, for a 360° course sensor, with two elementary loops per secondary winding and a target formed from "half-moon" sector with an opening, according to the prior art, α0 equal to 180°, a sector adjustment opening SA equal to 45° is taken out, according to the invention, in order to remove the 4th harmonic order, namely a sector quarter of the target. The opening of the target then has a value a equal to 135°.

The sensors are also characterized by the number r which is equal to the number of loops per secondary winding relative to the number of sectors of the target, namely $$\frac{k}{p}.$$

In the present example, the number of loops of each angular sector is such that the target passes through 2 loops of each secondary winding per course, and the value of r is then 2.

Under these conditions, each target sector has an angular opening α0 reduced by the target angular adjustment angular sector SA, which opening is equal to the fraction of the course C of the sensor relative to the number "r" of loops scanned per course and to the order of the harmonic "h" to be eliminated, namely $$SA = \frac{C}{(h*r)}.$$

In the above example, r=2 and h=4, C=360°, namely $$SA = \frac{C}{8} = 45.$$

The following Table 1 summarizes the values of the angular openings of each target sector, "α0" according to the prior art and "α" according to the invention, of the adjustment sectors SA in order to move from the openings α0 to the openings α for various targets, with values of r equal to 2 (as in the above example), 3 and 4.

Some values calculated in Table 1 for the angular openings of the target are to be considered, in practice, as orders of magnitude, and rounded values have then been introduced in the table.

Figure 2:
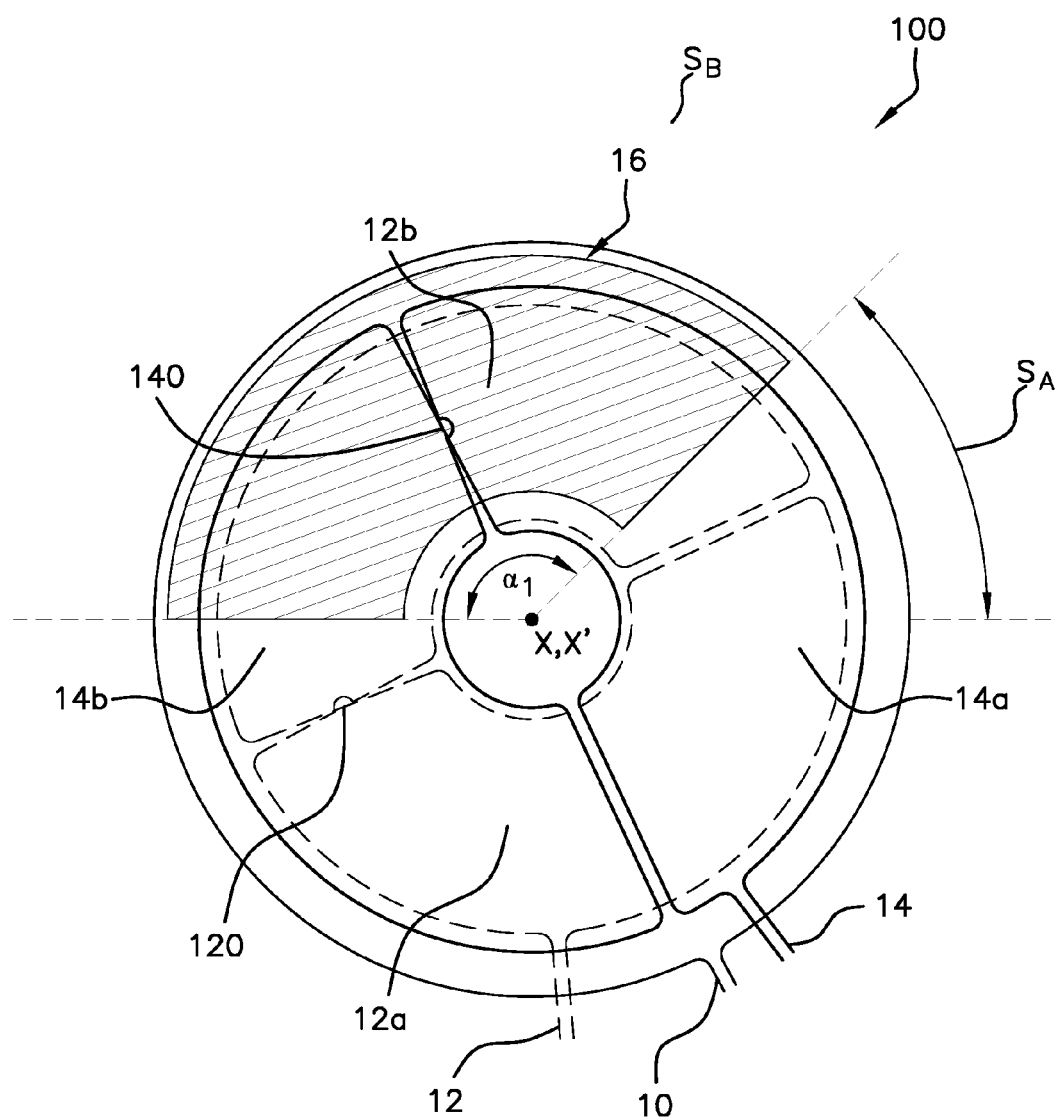
FIG. 2 is a diagram of an inductive sensor example according to the invention having a 360° course.
Figure 3:
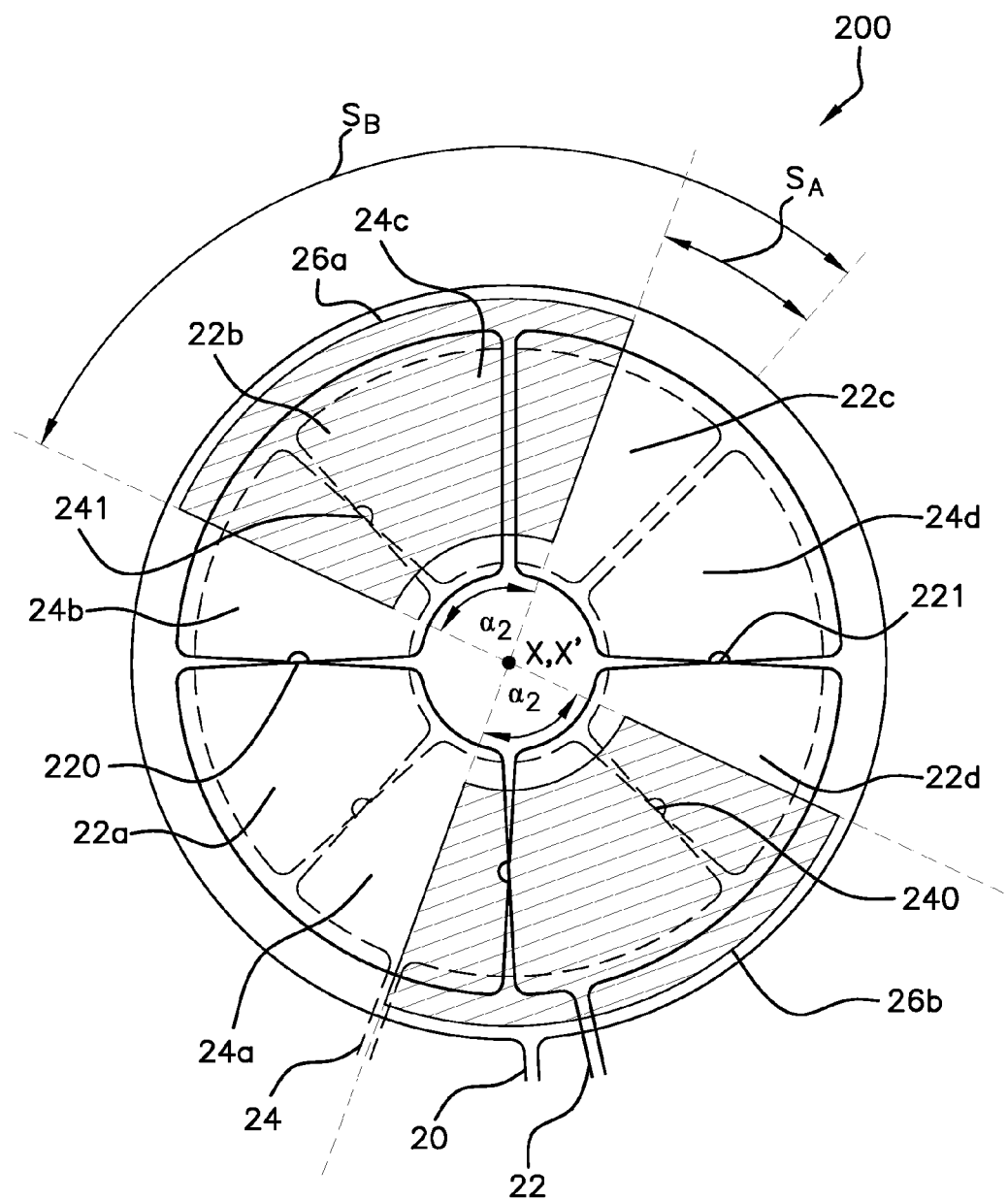
FIG. 3 is a diagram of an inductive sensor example according to the invention having a 180° course.

FIGS. 2 and 3 illustrate sensors having two secondary winding loops per course, as well as two secondary windings and courses equal to 360° and 180° respectively. FIG. 2 particularly shows an example of an inductive angular sensor 100 including, in a same plane, in this case the plane of the figure: a primary circuit 10, two secondary circuits 12 and 14 offset by 90° and a target 16 having a single sector (having the same reference 16), with a half-moon shape and a course equal to 360°.

TABLE 1

| | r = 2 | | | r = 3 | | | r = 4 | | |
|---|---|---|---|---|---|---|---|---|---|
| Course (C) | «α₀» Prior art | S_A | «α» according to the invention | «α₀» Prior art | S_A | «α» according to the invention | «α₀» Prior art | S_A | «α» according to the invention |
| 360 | 180 | 45 | 135 | 120 | 30 | 90 | 90 | 22.5 | 67.5 |
| 180 | 90 | 22.5 | 67.5 | 60 | 15 | 45 | 45 | 11.3 | 33.8 |
| 120 | 60 | 15 | 45 | 40 | 10 | 30 | 30 | 7.5 | 22.5 |
| 90 | 45 | 11.3 | 33.8 | 20 | 7.5 | 12.5 | 22.5 | 5.6 | 16.9 |

The circuits have a central symmetry about the central axis X'X and the target 16, which is hatched in the figure, rotates about the axis X'X, in a plane parallel to the plane of the circuits 10, 12 and 14. More particularly:

the fixed primary circuit 10 substantially covers 360°;

the fixed secondary circuit 12, in dotted line, has a contactless crossing 120 in order to form two loops 12a and 12b, and wherein the induction flux due to the primary current generates a voltage at the terminals of this secondary circuit;

the second fixed secondary circuit 14, in full line, has a contactless crossing 140 in order to also form two loops 14a and 14b, and wherein a voltage is induced;

each secondary winding circuit 12 or 14 indeed has two loops 12a, 12b and 14a, 14b per 360° course about the axis X'X;

the angular opening α0 of the target is normally 180° and, according to the invention, the adjusted angular opening α1 is, according to Table 1, 135° by reduction of an adjustment angular sector SA with an opening equal to 45°.

FIG. 3 shows another example of an inductive angular sensor 200 having two secondary winding loops per course, in this case of 180°. The fixed primary circuit 20 is identical to the circuit 10 of FIG. 2. Unlike the previous sensor 100:

each fixed secondary circuit 22 (in full line) and 24 (in dotted line) have four loops, 22a-22d, and 24a-24d respectively, with two crossings 220 and 221 for the circuit 22, and 240 and 241 for the circuit 24, respectively; the induced voltages are then reversed in two contiguous loops;

the secondary circuits 22 and 24 are offset by 45° about the axis X'X;

the movable target 26 is formed by two angular sectors 26a and 26b, each sector having an angular opening α2 which is equal to 67.5°, as indicated in Table 1.

The invention is not limited to the embodiments described and shown. The invention is suitable for any course value equal to $$\frac{360}{p},$$

corresponding to a target of p sectors. For example, for three loops per course (r=3), the number k of the secondary winding loops is equal to 3, 6 or 9, when the number of target sectors p is equal to 1, 2 or 3 respectively, generating courses C of 360°, 180° and 120°. There is generally two secondary windings, offset by an angle equal to half of the angular opening of a target sector, or more than two.

The invention claimed is:

1. An inductive sensor for measuring the angular position of a rotating part, the inductive sensor comprising:
    a primary winding associated with at least one secondary winding; and
    a target rigidly connected with the rotating part rotating about a central axis,
    the primary winding being centered about an axis that is coincident with the central axis of the target, and carrying a high-frequency alternating current which induces a voltage in each secondary winding,
    each secondary winding, which is centered about the central axis, is made up of a number k (k≥2) of substantially identical loops, forming angular sectors, with opening SB, which are successively crossed and arranged opposite the primary winding, and
    the target is made up of p (p≥1) angular sectors having a same angular opening α of value α0equal to the opening SB of the loop sectors and which are regularly distributed opposite the primary and secondary windings,
    wherein the opening α of each target angular sector is reduced by an adjustment angular sector SA which is equal to the fraction $$\frac{C}{(h*r)},$$

such that a α=SB−SA,
wherein:
C = an angular scanning course of the sensor between two target successive positions that are identical,
h= an order of the harmonic to be eliminated in a linearity deviation Fourier decomposition, which is defined between measured and real angular values for positions of the target over the course C, and
r = the number k of loops per secondary winding relative to the number p of sectors of the target:

$$r = \frac{k}{p}.$$

2. The inductive sensor according to claim 1, wherein the harmonic to be eliminated is of the 4th order and the adjustment angular sector SA is equal to a quarter of the angular opening of each winding loop.

3. The inductive sensor according to claim 2, wherein the sensor includes two secondary windings.

4. A method for measuring the angular position of a rotatable part using an inductive sensor according to claim 2, the method comprising:
    successively masking each of the angular sectors of each secondary winding with an angular opening SB with each angular sector of the target with an opening α that is less than the angular opening SB, an opening reduction being adjusted such that the voltage induced in each secondary winding has a sinusoidal variation;
    measuring the voltage at the terminals of each secondary winding;
    combining the amplitudes of the measured voltages using a same sinusoidal function; and
    providing a positional measurement for the target at each moment as a function of the amplitude of the sinusoidal function at the respective moment.

5. The inductive sensor according to claim 1, wherein the sensor includes two secondary windings.

6. The inductive sensor according to claim 5, wherein the secondary windings are offset by half a loop.

7. A method for measuring the angular position of a rotatable part using an inductive sensor according to claim 6, the method comprising:
    successively masking each of the angular sectors of each secondary winding with an angular opening SB with each angular sector of the target with an opening α that is less than the angular opening SB, an opening reduction being adjusted such that the voltage induced in each secondary winding has a sinusoidal variation;
    measuring the voltage at the terminals of each secondary winding;

combining the amplitudes of the measured voltages using a same sinusoidal function; and providing a positional measurement for the target at each moment as a function of the amplitude of the sinusoidal function at the respective moment.

8. A method for measuring the angular position of a rotatable part using an inductive sensor according to claim 5, the method comprising:

successively masking each of the angular sectors of each secondary winding with an angular opening SB with each angular sector of the target with an opening $\alpha$ that is less than the angular opening SB, an opening reduction being adjusted such that the voltage induced in each secondary winding has a sinusoidal variation;

measuring the voltage at the terminals of each secondary winding;

combining the amplitudes of the measured voltages using a same sinusoidal function; and providing a positional measurement for the target at each moment as a function of the amplitude of the sinusoidal function at the respective moment.

9. A method for measuring the angular position of a rotatable part using an inductive sensor according to claim 1, the method comprising :

successively masking each of the angular sectors of each secondary winding with an angular opening SB with each angular sector of the target with an opening $\alpha$ that is less than the angular opening SB, an opening reduction being adjusted such that the voltage induced in each secondary winding has a sinusoidal variation;

measuring the voltage at the terminals of each secondary winding;

combining the amplitudes of the measured voltages using a same sinusoidal function; and providing a positional measurement for the target at each moment as a function of the amplitude of the sinusoidal function at the respective moment.

10. The method for angular position measurement according to claim 9, wherein the used function is the arc tangent of the ratio of the amplitudes of the sinusoidal voltages measured at the terminals of two secondary windings, in phase quadrature.

* * * * *